(12) United States Patent
Paternoster et al.

(10) Patent No.: US 9,080,321 B2
(45) Date of Patent: Jul. 14, 2015

(54) MOLDED ARTICLE AND METHOD FOR PRODUCING A MOLDED ARTICLE

(75) Inventors: Rudolf Paternoster, Rinchnach (DE); Josef Geier, Regen (DE); Roland Reichenberger, Regen (DE)

(73) Assignee: SCHOCK GMBH, Regen (DE)

( * ) Notice: Subject to any disclaimer, the term of this patent is extended or adjusted under 35 U.S.C. 154(b) by 28 days.

(21) Appl. No.: 13/261,613

(22) PCT Filed: Sep. 6, 2011

(86) PCT No.: PCT/EP2011/004486
§ 371 (c)(1),
(2), (4) Date: Mar. 7, 2013

(87) PCT Pub. No.: WO2012/034663
PCT Pub. Date: Mar. 22, 2012

(65) Prior Publication Data
US 2013/0177736 A1   Jul. 11, 2013

(30) Foreign Application Priority Data

Sep. 17, 2010   (DE) .......................... 10 2010 046 627

(51) Int. Cl.
*E03C 1/18*  (2006.01)
*A47B 77/02*  (2006.01)
*B29C 39/02*  (2006.01)
(Continued)

(52) U.S. Cl.
CPC . *E03C 1/18* (2013.01); *A47B 77/02* (2013.01); *B29C 39/026* (2013.01); *B29D 99/0039* (2013.01); *C04B 26/06* (2013.01);
(Continued)

(58) Field of Classification Search
CPC ................................... C04B 20/0096
See application file for complete search history.

(56) References Cited

U.S. PATENT DOCUMENTS 5,218,013 A * 6/1993 Schock .......................... 523/209
6,365,662 B1 * 4/2002 Sakai et al. ................... 524/494
(Continued)

FOREIGN PATENT DOCUMENTS

DE   10 2008 047 758 B3   12/2009
DE   10 2008 046 569 A1   3/2010
(Continued)

OTHER PUBLICATIONS

Machine translation of WO 2004/065469; source: google patents, retrieved on Feb. 23, 2014.*
(Continued)

*Primary Examiner* — Aaron Austin
*Assistant Examiner* — Zheren J Yang
(74) *Attorney, Agent, or Firm* — Roylance, Abrams, Berdo and Goodman LLP

(57) ABSTRACT

A molded article, such as, a kitchen sink, a wash basin, a work surface, or the like, is produced from a composite material comprising a cured polymer binder and filler particles by molding. The surface of a visible face of the molded article, that is substantially horizontal when the molded article is in use, exhibits irregularities formed by pores. More than 30% and less than 90%, in particular more than 40% and less than 80%, and preferably more than 50% and less than 65% of the surface of the visible face is formed by pores with an average width of more than 0.1 mm and less than 1 mm, an average depth of more than 10 μm and less than 50 μm, and the average ratio of depth to width of the pores of more than 1:4 and less than 1:30.

27 Claims, 3 Drawing Sheets

(51) Int. Cl.
*C04B 26/06* (2006.01)
*B29D 99/00* (2010.01)
*B29K 105/16* (2006.01)
*C04B 111/00* (2006.01)

(52) U.S. Cl.
CPC .. *B29K 2105/16* (2013.01); *C04B 2111/00965* (2013.01); *C08K 2201/005* (2013.01); *Y10T 428/24355* (2015.01)

(56) References Cited

U.S. PATENT DOCUMENTS

| | | | |
|---|---|---|---|
| 2003/0147932 A1* | 8/2003 | Nun et al. | 424/405 |
| 2007/0014952 A1* | 1/2007 | Delong et al. | 428/35.7 |
| 2008/0132607 A1* | 6/2008 | Reichenberger et al. | 523/216 |
| 2010/0119798 A1* | 5/2010 | Kirschbaum et al. | 428/220 |
| 2012/0095126 A1* | 4/2012 | Nakamura | 523/122 |

FOREIGN PATENT DOCUMENTS

| | | | |
|---|---|---|---|
| EP | 0 491 170 | A2 | 6/1992 |
| EP | 1 807 453 | A1 | 7/2007 |
| EP | 2 165 817 | A1 | 3/2010 |
| EP | 2165817 | A1 * | 3/2010 |
| JP | 4460649 | B1 * | 5/2010 |
| WO | WO 2004065469 | A1 * | 8/2004 |

OTHER PUBLICATIONS

Machine translation of EP 2165817; source: google patents, retrieved on Sep. 6, 2013.*
Machine translation of WO 2004/065469 A1; source: google patents, retrieved on Feb. 23, 2014.*

* cited by examiner

| Specimen | Binder | Filler | Pigment | Additives | Total |
|---|---|---|---|---|---|
| 1 | 27.20%<br>21.24% MMA,<br>5.44% PMMA,<br>0.52% Trim | 71.14%<br>Quartz sand 0.05 - 0.2 mm | 1% black | 0.66%<br>peroxide, other | 100.00% |
| 2 | 27.20%<br>21.24% MMA,<br>5.44% PMMA,<br>0.52% Trim | 71.14%<br>55.9% quartz sand 0.05 - 0.2 mm<br>15.24% fused silica flour 0.01 - 0.05 mm | 1% black | 0.66%<br>peroxide, other | 100.00% |
| 3 | 27.20%<br>21.24% MMA,<br>5.44% PMMA,<br>0.52% Trim | 72.14%<br>57.7% quartz sand black 0.3 - 0.8 mm<br>14.44% quartz sand 0.05 - 0.2 mm | 0 | 0.66%<br>peroxide, other | 100.00% |
| 4 | 27.20%<br>21.24% MMA,<br>5.44% PMMA,<br>0.52% Trim | 72.14%<br>43.3% quartz sand black 0.3 - 0.8 mm<br>14.42% quartz sand 0.05 - 0.2 mm<br>14.42% fused silica flour 0.01 - 0.05 mm | 0 | 0.66%<br>peroxide, other | 100.00% |
| 5 | 26.00%<br>20.28% MMA,<br>5.2% PMMA,<br>0.52% Trim | 72.96%<br>67.3% quartz sand black 0.1 - 0.8 mm<br>5.66% quartz sand 0.05 - 0.2 mm | 0.17%<br>spangle | 0.87%<br>peroxide, other | 100.00% |
| 6 | 26.00%<br>20.28% MMA,<br>5.2% PMMA,<br>0.52% Trim | 72.96%<br>58.1% quartz sand black 0.1 - 0.8 mm<br>4.86% quartz sand 0.05 - 0.2 mm<br>10.0% cristobalite flour 0.01 - 0.05 mm | 0.17%<br>spangle | 0.87%<br>peroxide, other | 100.00% |
| 7 | 27.1%<br>20.28% MMA,<br>5.2% PMMA,<br>0.52% Trim | 71.7%<br>55.8% quartz sand black 0.1 - 0.8 mm<br>7.95% quartz sand 0.05 - 0.2 mm<br>7.95% cristobalite flour 0.01 - 0.05 mm | 0.13%<br>black | 1.07%<br>peroxide, other | 100.00% |
| 8 | 27.05%<br>20.28% MMA,<br>5.2% PMMA,<br>0.52% Trim | 71.7%<br>55.8% quartz sand black 0.1 - 0.8 mm<br>7.95% quartz sand 0.05 - 0.2 mm<br>7.95% cristobalite flour 0.01 - 0.05 mm | 0.13%<br>black | 1.12%<br>peroxide, other<br>0.1% anti-<br>sedimentation | 100.00% |

FIG. 4

| Specimen | Roughness before scratch test | | Roughness after scratch test | | Ratio Pore : Surface | Pore Dimensions | | | | Soiling | Impact resistance | Water vapor brightening |
|---|---|---|---|---|---|---|---|---|---|---|---|---|
| | $R_{max}$ | $R_z$ | $R_{max}$ | $R_z$ | | Width | Depth | Aspect | Angle | | | |
| 1 | 41.28 | 36.76 | 44.44 | 39.30 | 0.88 | 187 | 14.7 | 12.7 | 14.0 | 12.44 | 3.3 | 2.50 |
| 2 | 25.04 | 19.24 | 22.44 | 19.08 | 0.58 | 237 | 11.4 | 20.8 | 10.9 | 10.35 | 3.8 | 1.76 |
| 3 | 41.62 | 31.04 | 39.16 | 30.52 | 1.34 | 328 | 30.3 | 10.8 | 26.0 | 7.33 | 1.8 | 2.62 |
| 4 | 25.44 | 20.00 | 23.58 | 17.56 | 1.42 | 319 | 18.3 | 17.4 | 14.8 | 2.19 | 2.0 | 1.73 |
| 5 | 39.10 | 30.50 | 37.70 | 31.10 | 1.42 | 284 | 37.7 | 7.55 | 26.1 | 8.15 | 1.9 | 3.20 |
| 6 | 18.30 | 15.30 | 17.40 | 14.60 | 1.34 | 419 | 18.9 | 22.2 | 16.3 | 2.49 | 3.3 | 3.10 |
| 7 | 17.20 | 14.90 | 22.40 | 17.20 | 1.07 | 254 | 16.1 | 15.8 | 12.9 | 2.00 | 2.6 | 2.78 |
| 8 | 9.20 | 7.50 | 15.80 | 10.20 | 1.27 | 422 | 12.4 | 34.1 | 7.58 | 0.35 | 2.6 | 2.38 |

FIG. 5

MOLDED ARTICLE AND METHOD FOR PRODUCING A MOLDED ARTICLE

FIELD OF THE INVENTION

The invention relates to a molded article, such as, for example, a kitchen sink, a wash basin, a work surface, or the like, produced from a composite material comprising a cured polymer binder and filler particles embedded therein, preferable obtained by molding with a reusable mold, and to a method for producing the molded article.

BACKGROUND OF THE INVENTION

EP 0 361 101 B2 discloses a molding, which can fulfill a wide range of requirements with respect to the external visual appearance by varying the size and the color of the filler particles that are used. The molding exhibits very good performance characteristics, in particular a high resistance to abrasion and scratches.

DE 10 2008 047 758 B3 discloses a molding, which is processed on at least one visible face after casting in such a way that the molding has a tactilely and/or visibly perceptible waviness on the visible face, and that filler particles project up to the surface on the visible face and, as a result, form a part of the surface of the visible face.

SUMMARY OF THE INVENTION

The object of the present invention is to provide a molded article and an associated production method which further improves the cleanability of the surface of the molded article, in particular, the cleanability of the visible face of the molded article, which is substantially horizontal when the molded article is in use; and, at the same time, the molded article retains the good mechanical performance characteristics of the moldings known from the prior art.

This object is achieved by the molded article and the production method of the invention.

The surface of the visible face of the molded article, in particular, a surface of the visible face that is substantially horizontal when the molded article is in use, exhibits irregularities, formed by pores, or a respective roughness. Studies have shown that the shape of these pores, in particular their width and depth and, in addition, the aspect ratio of depth to width of the pores, has a significant effect on the cleanability of the surface. At the same time, the susceptibility to scratching is determined by the topography of the surface, so that it has to be guaranteed that in improving the ease of cleaning the susceptibility to scratching will not be significantly increased.

To this end, the surface of the visible face of the molded article according to the invention was measured at a plurality of positions that were spaced apart from each other. For example, a total of five fields of measurement, which were spaced apart from each other, were scanned in each of several strips in order to determine, in particular, the proportion of the surface formed by the pores on the visible face and the proportion of the remaining surface. For this purpose, a limit value was established for the depth of a roughness, for example 10 µm, at which the roughness is considered to be a pore. Then several specimens were analyzed with respect to the width, depth, and other essential parameters in each field of measurement; and in each instance these measured values were used to determine the average value.

It was found that when more than 30% and less than 90%, in particular more than 40% and less than 80%, and preferably more than 50% and less than 65%, of the surface (8) of the visible face is formed by pores with a width that amounts on average to more than 0.1 mm and less than 1 mm, a depth that amounts on average to more than 10 µm and less than 50 µm; and the ratio of depth to width of the pores lies on average between 1:4 and 1:30, the good mechanical performance characteristics are retained. Significant improvements in the cleanability are also achieved, in particular, in the case of the molded article having a color that is determined by the color of the filler particles and have a binder matrix that is transparent and contains, in particular, less than 1% color pigments.

In addition, it was found that this particular surface topography reduces the amount of water that is absorbed during the water vapor test and, as a result, reduces brightening, a feature that is particularly advantageous, especially when the molded article has a dark color. In particular, the visible faces that are substantially horizontal when the molded article is in use exhibit the surface topography according to the invention. In the case of built-in kitchen sinks, this visible face with the surface topography according to the invention is, for example, the bottom of the basin-shaped section and/or the draining surface. In the case of work surfaces, the entire surface forming the visible face is provided with a topography according to the invention.

In one embodiment, the average value of the width of the pores is more than 0.2 mm and less than 0.5 mm, in particular more than 0.25 mm and less than 0.45 mm. The width of the pores is defined by the shortest distance between two local height maxima, which are opposite each other with respect to the lowest point of the pore on the surface. Since the pores are usually not circularly round, the width of the pores varies. The length of the pores can be equal to the width of the pores or can be a multiple thereof.

In one embodiment, the average value of the depth of the pores amounts to more than 12 µm and less than 35 µm, in particular more than 15 µm and less than 25 µm. In this case, the depth of the pores is measured by means of the length of the normal, extending through the lowest point of the pore, on the connecting line, which is defined by two local height maxima of the pores that are opposite each other with respect to the lowest point.

In one embodiment, the average value of the ratio of depth to width of the pores amounts to less than 1:8 and more than 1:30, in particular less than 1:10 and more than 1:25, and preferably less than 1:12 and more than 1:25. This so-called aspect ratio determines the ease of cleanability of the surface of the molded article. Since the aspect ratio is highly dependent on the width of the pore, and this width varies with pores that deviate from the circular shape, the ease of cleanability is also basically direction-dependent. However, when the pores that deviate from the circular shape are arranged and oriented in such a way that they are statistically more or less uniformly distributed, the result is, on average, cleanability that is independent of the direction.

In one embodiment, the pores exhibit a pore inclination angle having an average value that amounts to more than 8° and less than 30°, in particular more than 10° and less than 25°, and preferably more than 12° and less than 22° or more than 12° and less than 20°. In this case, the pore inclination angle is that angle that is enclosed by two legs. The first leg is defined by means of the connecting line of two local height maxima of the pore that are situated opposite each other with respect to the lowest point of the pore. The second leg is defined by the two points on the pore contour that correspond to a pore depth of 10% or 90% respectively. As an alternative or also in addition, the first leg can be formed by a horizontal line; and/or the second leg can be formed by the tangent to the section of the contour of the pore with the maximum gradient. In the case of a digital measuring microscope, the section with the maximum gradient of the contour of the pore can be recognized by visual observation by means of a stark change in the color representing the height or can also be determined automatically. In order not to obtain incorrect measurements due to individual outliers, it is not only possible to measure a singular point during the measurement, but also to perform an averaging over a specifiable surface area that is to be measured, for example, a surface area of 4, 25, 100, or 400 μm². In addition, an additional averaging of the measured values is performed by taking the average over multiple pores of a specimen and/or over a plurality of measurement points on a specimen. The ease of cleanability is further improved by means of the pore inclination angle according to the invention.

In one embodiment, the surface roughness, formed by the pores, is irregular. The result is that the cleanability of the surface is independent of the direction.

Basically, the pores can also be produced by a mold surface that is configured correspondingly, especially if a binder matrix almost perfectly reproduces the mold surface, as described in EP 1 807 453 B1.

In one embodiment, the pores are produced in a form-free manner by shrinking away from the mold during curing of the polymer binder. After the binder has cured, the filler particles are coated with a closed layer of the polymerized binder. The shrinkage is induced by the polymerization of the monomer contained in the binder. The degree to which the molded article or more specifically the binder matrix shrinks away from the mold during curing can be controlled by means of additives, in particular can be reduced by the addition of crosslinking agents, as described in EP 1 807 453 B1. Therefore, the shape of the pores can be influenced, among other things, by the proportion of the crosslinking agent to the binder compound.

The crosslinking agent that is used is preferably a bi-functional or multi-functional monomer or polymer, in particular a bi-functional or multi-functional acrylate or methacrylate, such as, for example, ethylene glycol dimethacrylate or trimethylolpropane trimethacrylate (TRIM). Other possible crosslinking agents are pentaerythritol triacrylate, pentaerythritol tetraacrylate, glycerin dimethacrylate, or bisphenol-A-ethoxylate(2)dimethacrylate. It may also be advantageous to use a combination of two or more such crosslinking agents.

Molding is carried out preferably by means of a casting process, by means of which, in particular, a largely homogeneous distribution of the filler particles in the binder can be achieved with simultaneously a relatively high packing density of the filler particles in the fabricated molded article.

In one embodiment, the filler particles determine in essence the color of the molded article on the visible face. The filler particles can have an intrinsic color and/or a color coating on the surface. In contrast, the matrix formed by the binder is substantially transparent. If need be, a pigment having a percentage by weight of less than 1%, in particular less than 0.5%, and preferably less than 0.2%, based on the weight of the molded article, is used to support the color of the filler particles, especially in the case of black or dark molded articles. Irrespective of the aforesaid, the color of the filler particles determines the color of the molded article.

In one embodiment, the percentage by weight of the filler particles lies between 40% and 85%, based on the weight of the molded article, in particular between 60% and 80%, and preferably between 65% and 76%. This guarantees the stability and, in particular, the scratch resistance of the molded article.

In one embodiment, the filler particles have a higher Mohs hardness than the binder. This feature allows the mechanical properties, in particular, the abrasion resistance, of the fabricated molded article to be determined or in any case largely influenced by the choice of filler particles. In one embodiment, more than 50%, preferably more than 75%, of the filler particles have a Mohs hardness of at least 6, in particular a Mohs hardness of at least 7. In principle, all fillers that have a suitably high Mohs hardness may be considered. In one embodiment, at least one fraction of the filler particles, preferably all filler particles, consists/consist of silicon dioxide. The filler particles may be introduced in the form of sand or flour and, in particular, with several fractions of different grain size. It is also possible to use modification of the silicon dioxide as the filler particles, for example, cristobalite.

In one embodiment, the filler particles have a first fraction with a grain size of at least 0.1 mm, in particular at least 0.2 mm, and preferably at least 0.3 mm, with a percentage by weight of more than 40%, in particular more than 50% and preferably more than 55%, based on the weight of the molded article. At least one portion of the first fraction can have a colored coating, which substantially determines the visual appearance of the molded article.

In one embodiment, the filler particles have a fraction with a grain size of a maximum of 0.1 mm, in particular maximally 0.08 mm, and preferably maximally 0.05 mm, with a percentage by weight of more than 3%, in particular more than 5%, and preferably more than 10%, based on the weight of the molded article. The percentage by weight of this finer filler can amount to less than 40%, in particular less than 30%, and preferably less than 20%, based on the weight of the molded article. In addition to the increase in the ease of cleanability, the addition of this fine filler also enhances the impact resistance of the molded article.

In one embodiment, the filler particles have not only the aforementioned first fraction, but also a second fraction with a grain size between 0.05 mm and 0.2 mm, with a percentage by weight between 3% and 25%, in particular between 4% and 20%, and preferably between 4.5% and 15%, based on the weight of the molded article. Furthermore, the filler particles have a third fraction with a grain size between 0.01 mm and 0.05 mm, with a percentage by weight between 4% and 25%, in particular between 6% and 20%, and preferably between 8% and 15%, based on the weight of the molded article.

The aforesaid formulation was used to produce molded articles with a surface in which more than 30% and less than 90%, in particular more than 40% and less than 80%, and preferably more than 50% and less than 65% of the surface of the visible face is formed by pores having a width that amounts to more than 0.25 mm and less than 0.45 mm, and having a depth that amounts to more than 15 μm and less than 25 μm; and the ratio of depth to width of the pores lies between 1:12 and 1:25. Given the very good mechanical performance characteristics, in particular the scratch and impact resistance, such molded articles exhibit outstanding cleanability. The fabricated molded articles have a three-dimensional shape that deviates from a plate shape. In particular, the molded article has at least one section in the shape of a basin.

The invention also relates to a method for producing such a molded article, with the molded article being produced from a composite material comprising a cured polymer binder and filler particles embedded therein, preferably by molding in a re-usable mold. In this case, the molded article is produced by means of casting molds by filling the reaction mixture, consisting of binders, filler particles, and optionally other additives, into the mold.

Additional advantages, features, and details of the invention will become apparent from the following description, in which several exemplary embodiments are described in detail with reference to the drawings. The features referred to in the claims and the specification are essential for the invention individually or in any combination.

BRIEF DESCRIPTION OF THE DRAWINGS

The following is a brief description of the accompanying drawings, in which:

FIG. 4 is a chart showing the composition of a total of eight specimens; and FIG. 5 is a chart of the results in terms of the performance characteristics obtained from eight specimens.

DETAILED DESCRIPTION OF THE INVENTION

Figure 1:
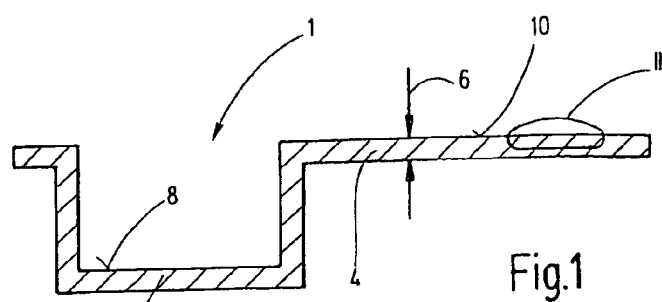
FIG. 1 is a side elevational view in section of a molded article according to the invention.

FIG. 1 shows a sectional view of a molded article 1 of the invention, which is a kitchen sink, in particular a built-in kitchen sink, with a basin-shaped section 2 and a draining surface 4, which is designed in one piece with the basin shaped section. The molded article 1 is produced from a composite material comprising a cured polymer binder and filler particles embedded therein. The production is carried out by molding a preferably repeatably usable mold. In the exemplary embodiment, the wall thickness 6 of the molded article 1 lies between 5 and 15 mm. When the kitchen sink is installed, the visible face 10 forms the surface of the draining surface 4 and is aligned substantially horizontally, just as the bottom surface 8 of the basin-shaped section 2. In particular, these horizontal surfaces of the visible face 10 have a surface topography according to the invention.

A preferred composition of the molded article 1 includes 60% to 80% by weight of a mineral filler, in particular, between 68% and 75%, preferably $SiO_2$. More than 40% by weight of the filler particles, based on the weight of the molded article 1, have a particle size of more than 0.1 mm, in particular more than 0.2 mm, and preferably more than 0.3 mm. In addition, a second and optionally also a third fraction of filler particles with a smaller grain size are used, for example, a second fraction with a grain size between 0.05 mm and 0.2 mm with a percentage by weight between 3% and 25%, and a third fraction with a grain size between 0.01 mm and 0.05 mm with a percentage by weight between 4% and 25%, based in each case on the weight of the molded article 1.

The binder that is used is a solution of polymethyl methacrylate (PMMA) in methyl methacrylate (MMA), in which the proportion of the PMMA to this solution is between 15% and 30% by weight. In total, the percentage by weight of the binder is between 20% and 35%, in particular 25% and 30%, based on the weight of the molded article. The MMA content, based on the weight of the molded article, is between 15% and 25%, in particular between 18% and 23%. The PMMA content, based on the weight of the molded article 1, is between 3% and 8%, in particular, between 4% and 6%. In addition, it is also possible to add a crosslinking agent having a percentage by weight between 0.2% and 2%, in particular between 0.3% and 1%, and preferably between 0.4% and 0.7%, based on the weight of the molded article.

Furthermore, it is also possible to add an initiator, for example, a peroxide, in an amount between 0.3% and 2% by weight, based on the weight of the molded article. In addition, it is possible to add color pigments comprising a content between 0.05% and 2%, in particular between 0.05% and 1%, and preferably between 0.05% and 0.3%, based on the weight of the molded article, and/or the spangle elements with a content between 0.05% and 1%, in particular between 0.05% and 0.6%, and preferably between 0.1% and 0.3%, based on the weight of the molded article, which yields a metallic effect of the visible face.

Figure 2:
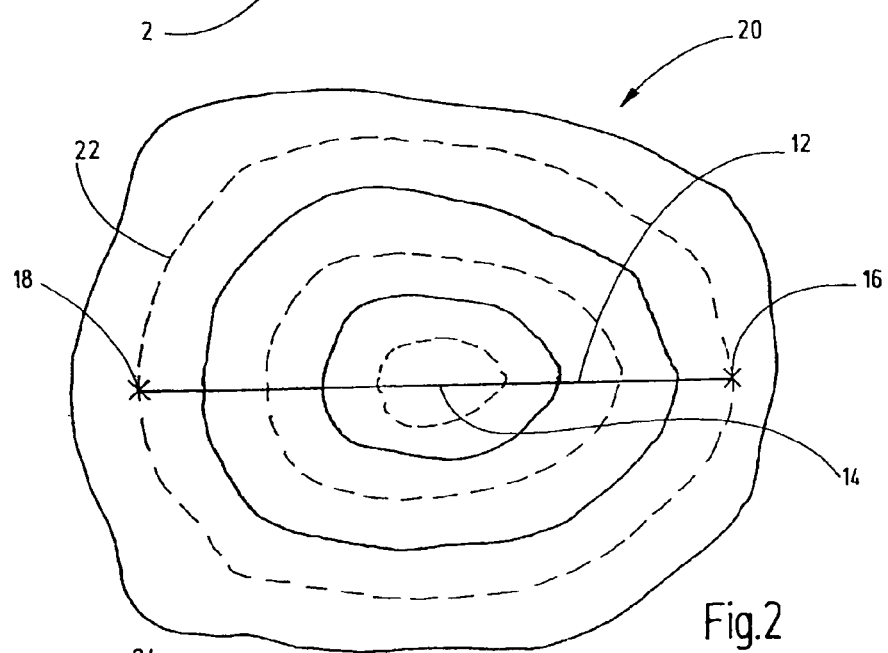
FIG. 2 is an enlarged top plan view of a detail of the molded article from FIG. 1 in the region of the draining surface.

FIG. 2 shows an enlarged top view of a detail of the molded article 1 from FIG. 1 in the region of the draining surface 4. In the exemplary embodiment, the molded article was measured at five positions that are spaced apart from each other. Inside one field of measurement ranging from 1,200 μm to 1,500 μm, the topography of the surface was determined at each position along five measuring strips that extend parallel to each other at a distance of 300 μm. Roughness having a depth of at least 10 μm was defined as a pore 20. The resulting value was used to calculate the proportion of pores 20 to the surface. Then a total of three pores 20 were measured inside each field of measurement by determining the topography, shown in FIG. 2. The resulting values of the measurements were used to find the arithmetic mean.

Figure 3:
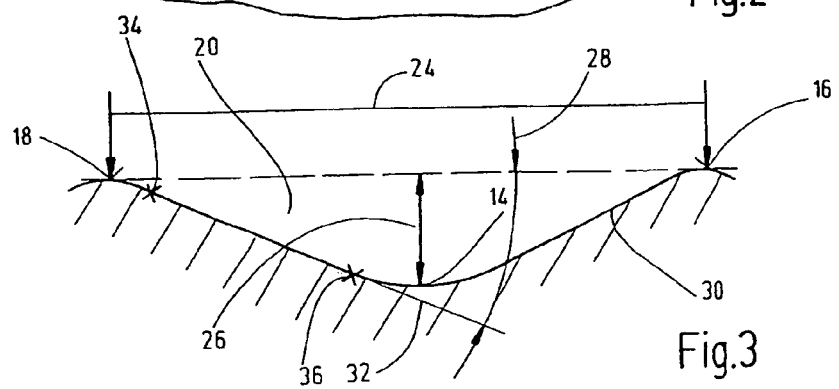
FIG. 3 is a profile of the surface of the visible face of the molded article along the strip shown in FIG. 2.

FIG. 2 shows the height lines, each of which has a height distance of 5 μm of a pore of the surface. FIG. 3 is a drawing (not drawn to scale) of the profile of the surface of the visible face 10 of the molded article 1 along the strip 12 shown in FIG. 2. In this case, the strip 12 connects two local height maxima 16, 18, which are opposite each other with respect to the lowest point 14 of the pore 20; and these two local height maxima lie on a boundary line 22 of the pore 20. The distance between the two local height maxima 16, 18 defines the width 24 of the pore 20, which amounts to 319 μm in the exemplary embodiment. The vertical distance of the lowest point 14 from the connecting line between the two local height maxima 16, 18, defines the depth of 26 of the pore 20, which amounts to 18.3 μm in the exemplary embodiment. The ratio of depth 26 to width 24 defines the aspect ratio of the pore 20, which amounts to 17.4 in the present case. The pore inclination angle 28 is the angle that, on the one hand, is enclosed by the connecting line between the two local height maxima 16, 18 and, on the other hand, is enclosed by a leg 32. The leg 32 is defined by a first point 34 on the pore contour 30, which lies at a depth of 10% of the pore depth 26, and a second point 36, which lies at a depth of 90% of the pore depth 26. As an alternative, the leg 32 can also be defined by the tangent to the steepest point of the pore contour 30. In the exemplary embodiment, the pore inclination angle 28 amounts to about 14.8° in both cases.

FIG. 4 shows the composition of a total of eight specimens, which are essentially identical with respect to the binder content and the composition of the binder, but are different with respect to the filler. FIG. 5 shows the roughness and the pore values, determined by measurement techniques, as well as the performance characteristics that were achieved. For the measured parameters, maximum roughness depth $R_{max}$ and averaged roughness depth $R_z$, it holds, before and after a scratch test, that the smoother the surface, the smaller the measured values. The determination of the averaged roughness depth $R_z$ and the maximum roughness depth $R_{max}$ was carried out according to DIN 4768 or DIN EN ISO L562, edition: 1998-09. The averaged roughness depth $R_z$ is determined by averaging over five individual roughness depths, so that the effect of outliers on the measured value is reduced. The maximum roughness depth $R_{max}$ is the greatest individual roughness depth within the overall measured distance having a length that can be defined; and this maximum roughness depth amounts to 15 mm in the exemplary embodiment.

The roughness was measured, after producing the sample piece, as "roughness before the scratch test." Then a scratch test was conducted, for which the associated scratching device is in accordance with DIN 53799 T10 or DIN 13310, and the scratching diamond has a 60° tapering with a 90 μm edge diameter.

The proportion of the surface area of pores 20 to the surface of the molded article 1 can be determined as described above. In this respect, FIG. 5 shows for each specimen the calculated quotient ("ratio pore:surface area") of the surface area of the pores 20 and the area of the part of the surface that is not considered to be a pore 20. A value of the quotient of, for example, 1 corresponds to a proportion of the surface area of pores 20 to the total surface of 50%; a quotient of 1.5 corresponds to a proportion of the surface area of pores 20 of 60%.

The pore dimensions were determined with the aid of a digital measuring microscope, with which it is possible to photograph the surface in small layers. Then a two-dimensional image of the surface topography is calculated, with which the individual pores can be determined by means of measurements.

With respect to the ease of cleanability, the soiling parameters are especially important; and in this case, a small value represents good cleanability. In order to determine this cleanability, a sample piece is soiled as defined; and after a defined cleaning with water and a cleaning suspension, the dirt remaining on the surface is determined by photoelectric sensing and visual observation under defined conditions.

The impact resistance is determined in accordance with DIN EN ISO 179 with a "FRANK pendulum impact tester" with a 0.5 Joule pendulum. In this case, ten material specimens were measured and averaged. The numerical values are given in the unit $mJ/mm^2$. A high value stands for a good impact resistance.

With respect to the undesired brightening, the sample pieces were exposed to water vapor, and then a brightening or more specifically a color change was determined. In this case, high values stand for an undesired and higher intensity brightening.

FIG. 5 shows that, in particular, specimen no. 4 has very good properties, specifically a good ease of cleanability with high impact resistance and low brightening. The specimens no. 6 and no. 7 also exhibit very good ease of cleanability as well as a high impact resistance and still acceptable values with respect to the brightening. A comparison of specimen 5 exhibiting only moderate cleanability characteristics with specimen 6 exhibiting very good cleanability characteristics shows the effect of the aspect ratio. Specimen no. 8 shows very good cleanability characteristics owing to the very smooth surface, but no optimal results with respect to scratch resistance. The positive results with respect to the ease of cleanability correlate with a specimen width between 250 and 450 μm as well as with an aspect ratio between 1:12 and 1:25 and a pore inclination angle between 12° and 20°.

The studies in connection with the present invention have shown surprisingly that a surface which is relatively smooth according to the roughness values $R_z$ and/or $R_{max}$, which are typically used in the technology, does not necessarily have good cleanability, as shown by a comparison of specimen 2 with specimen 4. Rather, the shape of the pores which may be found on the surface, in particular the width and the depth of the pores and additionally the aspect ratio of depth to width of the pores as well as the pore inclination angle, also have, or even predominantly have, a significant effect on the cleanability of the surface.

What is claimed is:

1. A molded article produced from a composite material comprising a cured polymer binder and filler particles embedded within the cured polymer binder and molded from a reusable mold, said molded article comprising:
   a visible face that is substantially horizontal during use, said visible face having a surface with irregularities formed by a plurality of pores in the cured polymer binder, said pores forming more than 30% and less than 90% of said surface, said pores having an average width of more than 0.1 mm and less than 1 mm, an average depth of more than 10 μm and less than 50 μm, and a ratio of said depth to said width of 1:4 to 1:30, and
   said molded article being produced in a free-form manner by curing and shrinking of the polymer binder to form said pores and to shrink away from a mold surface of the mold and to coat said filler particles with a closed layer of the polymer binder.

2. The molded article according to claim 1, wherein the average width of the pores is more than 0.2 mm and less than 0.5 mm.

3. The molded article according to claim 1, wherein the average depth of the pores is more than 12 μm and less than 35 μm.

4. The molded article according to claim 1, wherein the average ratio of depth to width of the pores is between 1:8 and 1:30.

5. The molded article according to claim 1, wherein the pores exhibit a pore inclination angle having an average value of more than 8° and less than 30°.

6. The molded article according to claim 1, wherein said pores have an irregular shape.

7. The molded article according to claim 1, wherein the filler particles substantially determine the color effect of the visible face and where a matrix formed by the binder is essentially transparent.

8. The molded article according to claim 1, wherein the percentage by weight of the filler particles is between 40% and 85%, based on the weight of the molded article.

9. The molded article according to claim 1, wherein the filler particles have a first fraction with a grain size of at least 0.1 mm in an amount of more than 40% by weight based on the weight of the molded article.

10. The molded article according to claim 1, wherein the filler particles have a fraction with a grain size with a maximum of 0.1 mm in an amount of 3% by weight, based on the weight of the molded article.

11. A molded article produced from a composite material comprising a cured polymer binder and filler particles embedded within the cured polymer binder and molded from a reusable mold, said molded article comprising:
   a visible face that is substantially horizontal during use, said visible face having a surface with irregularities formed by a plurality of pores in the cured polymer binder, said pores forming more than 30% and less than 90% of said surface, said pores having an average width of more than 0.1 mm and less than 1 mm, an average depth of more than 10 μm and less than 50 μm, and a ratio of said depth to said width of 1:4 to 1:30,
   the filler particles having a first fraction with a grain size of at least 0.1 mm, in an amount of more than 40% by weight, based on the weight of the molded article, a second fraction with a grain size between 0.05 mm and 0.2 mm, in an amount of 3% and 25% by weight, based on the weight of the molded article, and a third fraction with a grain size between 0.01 mm and 0.05 mm, in an amount of 4% and 25% by weight, based on the weight of the molded article, and said molded article being produced in a free-form manner by curing and shrinking of the polymer binder to form said pores and to shrink away from a mold surface of the mold.

12. The molded article of claim 1, wherein
said pores have an average width of more than 0.25 mm and less than 0.45 mm.

13. The molded article of claim 12, wherein
said pores have an average depth of more than 12µ and less than 35µ.

14. The molded article of claim 13, wherein
the average ratio of the depth to the width of the pores is 1:10 to 1:25.

15. The molded article of claim 13, wherein
the average ratio of the depth to the width of the pores is 1:12 to 1:25.

16. The molded article of claim 1, wherein
the pores have an average inclination angle of more than 10° and less than 25°.

17. The molded article of claim 1, wherein
the pores have an average inclination angle of more than 12° and less than 20°.

18. The molded article of claim 1, wherein
said molded article comprises said filler particles in an amount of 65% to 76% by weight.

19. The molded article of claim 10, wherein
said fraction of filler particles have a maximum grain size of 0.08 mm.

20. The molded article of claim 10, wherein
said fraction of filler particles have a maximum grain size of 0.05 mm.

21. The molded article of claim 11, wherein
said first fraction has a grain size of at least 0.2 mm in an amount of more than 50% by weight, said second fraction is present in an amount of 4% to 20% by weight, and said third fraction is present in an amount of 6% to 20% by weight.

22. The molded article of claim 11, wherein
said first fraction is present in an amount of more than 55% by weight, said second fraction is present in an amount of 4.5% to 15% by weight, and said third fraction is present in an amount of 8% to 15% by weight.

23. The molded article of claim 1, wherein
more than 40% and less than 80% of said surface of said visible face is occupied by said pores.

24. The molded article of claim 1, wherein
more than 50% and less than 65% of said surface of said visible face is occupied by said pores.

25. A molded article produced from a composite material comprising a cured polymer binder and filler particles embedded within the cured polymer binder and molded from a reusable mold, said molded article comprising:

a visible face that is substantially horizontal during use, said visible face having a surface with irregularities formed by a plurality of pores in the cured polymer binder, said pores forming more than 30% and less than 90% of said surface, said pores having an average width of more than 0.1 mm and less than 1 mm, an average depth of more than 10 µm and less than 50 µm, and a ratio of said depth to said width of 1:4 to 1:30, and said molded article being produced in a free-form manner by curing and shrinking of the polymer binder to form said pores and to shrink away from a mold surface of the mold, said polymer binder including a cross-linking agent in an amount sufficient to produce shrinking of the polymer binder during curing to produce said pores and to coat the filler particles with a closed layer of the polymer binder.

26. A method of producing the molded article of claim 1, wherein said method comprises the steps of introducing a molding composition into a mold having a mold surface, said molding composition comprising a polymerizable binder and 40% to 85% of filler particles, curing said molding composition so that said binder shrinks to produce said pores and pulls away from said mold surface, and removing said molded article from said mold.

27. The molded article of claim 1, wherein
said filler particles are included in an amount of 60% to 80% by weight based on the weight of the molded article, and said polymer binder includes a cross-linking agent in an amount to produce shrinking of the polymer binder during curing to produce said pores.

* * * * *